(12) United States Patent
Arai et al.

(10) Patent No.: US 7,686,999 B2
(45) Date of Patent: Mar. 30, 2010

(54) MANUFACTURING METHOD OF POLYMER FILM

(75) Inventors: Toshinao Arai, Kanagawa (JP); Hidekazu Yamazaki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 70 days.

(21) Appl. No.: 11/723,288

(22) Filed: Mar. 19, 2007

(65) Prior Publication Data

US 2007/0216060 A1 Sep. 20, 2007

(30) Foreign Application Priority Data

Mar. 17, 2006 (JP) .............................. 2006-075144

(51) Int. Cl.
- *B29D 7/00* (2006.01)
- *B29C 71/00* (2006.01)
- *B29C 55/00* (2006.01)

(52) U.S. Cl. ..................... 264/216; 264/237; 264/290.2

(58) Field of Classification Search ................ 264/212, 264/216, 217, 1.34, 1.6, 28, 234, 235, 235.6, 264/235.8, 237, 288.4, 290.2, 291
See application file for complete search history.

(56) References Cited

U.S. PATENT DOCUMENTS

| | | | | |
|---|---|---|---|---|
| 5,490,035 A * | 2/1996 | Yen et al. | ..................... | 361/311 |
| 5,856,468 A * | 1/1999 | Shuto et al. | ..................... | 536/64 |
| 5,977,347 A * | 11/1999 | Shuto et al. | ..................... | 536/64 |
| 6,582,755 B2 * | 6/2003 | Bao et al. | ..................... | 427/64 |
| 2003/0057595 A1 * | 3/2003 | Tsujimoto | ..................... | 264/217 |
| 2004/0104496 A1 * | 6/2004 | Arai et al. | ..................... | 264/28 |
| 2005/0073071 A1 * | 4/2005 | Yamazaki et al. | ..................... | 264/216 |
| 2005/0242465 A1 * | 11/2005 | Arai et al. | ..................... | 264/216 |
| 2006/0286313 A1 * | 12/2006 | Fukagawa et al. | ..................... | 428/1.31 |
| 2009/0032993 A1 * | 2/2009 | Yokoyama | ..................... | 264/212 |
| 2009/0224217 A1 * | 9/2009 | Nakayama et al. | ..................... | 252/585 |

FOREIGN PATENT DOCUMENTS

| | | |
|---|---|---|
| JP | 2003-071863 A | 3/2003 |
| JP | 2003-170492 A | 6/2003 |
| JP | 2004-314529 A | 11/2004 |
| JP | 2005-104148 A | 4/2005 |
| JP | 2005-173024 A | 6/2005 |

* cited by examiner

*Primary Examiner*—Joseph S Del Sole
*Assistant Examiner*—Ryan Ochylski
(74) *Attorney, Agent, or Firm*—Sughrue Mion, PLLC

(57) ABSTRACT

A casting film is made by casting dope including polymer and solvent on a casting drum whose surface is cooled. The casting film becomes to have a self-supporting property by cooling solidification, and then peeled as a wet film from the casting drum. The wet film is fed into a pin tenter in which both side edges of the wet film is held by plural pins. The wet film is dried while conveyed through the pin tenter, to become a film. Next, the film having predetermined X-ray diffraction intensity is fed into a clip tenter. While the film whose both side edges are held by clips is conveyed, it is stretched in the width direction thereof at a stretch rate in a range of 15% to 40%, to control molecular orientation in the film.

6 Claims, 6 Drawing Sheets

MANUFACTURING METHOD OF POLYMER FILM

BACKGROUND OF THE INVENTION

1. Field of the Invention

The present invention relates to a manufacturing method of a polymer film usable as an optical functional film such as a protective film of a polarizing plate of a liquid crystal display, an optical compensation film or the like.

2. Description of the Related Arts

A polymer film (hereinafter called as the film) has superior optical transparency and flexibility, and allows reduction in thickness and weight thereof. Accordingly, the polymer film is used as various optical functional films. Especially, a cellulose ester film such as a cellulose acylate film is used as a photosensitive film, a protective film of a polarizing plate of a liquid crystal display (LCD) whose market is expanding recently, an optical compensation film and the like, because of having toughness and low birefringence.

As methods for producing the film, there are a melt extrusion method and a solution casting method. The melt extrusion method has an advantage in high productivity and low cost for a production apparatus, because polymers are melted and then extruded from an extruder to produce the film. However, in this method, accuracy of the film thickness is low, and minute streaks (die lines) are generated on the film. Accordingly, it is difficult to produce the film with high quality sufficient to be used as the optical film. In contrast, in the solution casting method, polymers are dissolved to a solvent to prepare a polymer solution (dope), and the dope is cast on a moving support to form a casting film. After having a self-supporting property, the casting film is peeled from the support as a wet film, and dried so as to become a film. The film produced in this method is more excellent in optical isotropy and uniformity of thickness and has less foreign particles than that obtained in the melt extrusion method. For above reasons, most of the optical films for the LCD and the like are produced by the solution casting method.

The LCDs are classified into various modes such as VA (Vertical Aligned) mode for high-contrast, IPS (In-Plane Switching) mode for wide viewing angle, and OCB (Optically Compensated Birefringence) mode for wide viewing angle and quick response, based on an operating mode of a liquid crystal layer. The optical film for the LCD is required that a phase difference (retardation) according to degree (strength) of orientation of the film is large (high retardation value) to realize high contrast and wide view angle, regardless of the mode of LCD.

To give the high retardation value to the film, generally tension is applied on the film in the width direction or the longitudinal direction thereof to stretch it so that molecular orientation in the film is controlled. Recently proposed in the above method is that a content of the remaining solvent and other conditions in the film at the stretching are determined in certain ranges, to give much higher retardation value to the film (for example, Japanese Patent Laid-Open Publications No. 2003-170492, No. 2004-314529 and No. 2005-173024). In addition, there is a proposed method in which preparing and casting method of the dope, manufacturing conditions of the film and so on are determined in detail, so as to manufacture the film having superior optical properties such as high retardation value and superior transparency (for example, Japanese Patent Laid-Open Publication No. 2005-104148).

Although these methods can produce the film having high retardation value in certain level, the required value for the retardation is increasing year by year. It is difficult for these methods to satisfy the increased requirement. In addition, when the film is stretched by strong force to increase the retardation value, minute voids are possibly generated in film regions on which strong stresses are applied, that makes the film cloudy (degrading the transparency). To avoid these problems, there is a proposed method to produce the film with high transparency, in which a type of support for casting dope and manufacturing conditions until a casting film being peeled from the support are determined (for example, Japanese Patent Laid-Open Publication No. 2003-071863).

According to the method of the Japanese Patent Laid-Open Publication No. 2003-071863, the film having the superior transparency can be obtained by procedures that a casting belt wound around a drum is used as the support, the drum is cooled to form the casting film in low temperature, and time taken for peeling the casting film from the casting belt is determined. However, there is no statement in this publication about how to realize the required high retardation value for the film to be used in the LCD and the like. In addition, when the cooled drum as the above method is used, the casting film is formed by cooling solidification of the dope. Since the wet film right after the peeling of the casting film from the support is considerably soft, it is difficult to dry the wet film while convey it stably.

SUMMARY OF THE INVENTION

An object of the present invention is to provide a manufacturing method which can stably produce a polymer film having high retardation value and superior transparency. The polymer film obtained by the present invention has optical properties suitable as a phase difference film for VA mode, IPS mode and OCB mode.

In order to achieve the above and other objects, in a manufacturing method of a polymer film, at first dope including polymer and solvent is cast on a support for forming a casting film. After the casting film has a self-supporting property, it is peeled as a wet film from the support. Then the wet film is dried to be the polymer film which satisfies $K2 \leq K1$, when $K1$ is a maximum value of X-ray diffraction intensity in a range of $0 \leq 2\theta \leq 10$ and $K2$ is a maximum value of X-ray diffraction intensity in a range of $10 \leq 2\theta \leq 20$, in an X-ray analysis chart obtained by reflection method in which an angle between an extended line of an entering X-ray and a reflected X-ray is determined as $2\theta(°)$. Finally, the polymer film is stretched in the width direction thereof at a stretch rate in a range of 15% to 40%.

It is preferable that the casting film becomes to have the self-supporting property by cooling solidification. It is preferable that the cooling solidification of the casting film is performed by keeping a surface temperature of the support approximately constant within a range of −10° C. to 10° C. It is preferable that the wet film is dried by a pin tenter in which the wet film is conveyed with both side edges thereof being held by plural pins. In addition, it is preferable that the polymer film is stretched by application of tension in the width direction with use of a clip tenter in which the polymer film is conveyed with both side edges thereof being held by clips.

According to the present invention, the casting drum whose surface is cooled to the predetermined temperature range is used as the support on which the dope is cast, the casting dope becomes to have the self-supporting property by the cooling solidification, the wet film obtained by peeling the casting film from the support is dried to be the polymer film, and the polymer film is further dried and stretched in the width direction thereof while conveyed with both side edges thereof being held by the clips. The pin tenter with the plural pins is used for drying the wet film, and the clip tenter with clips is used for stretching the polymer film. Accordingly, a high retardation value can be applied to the polymer film without degrading transparency, and the polymer film can have superior optical properties.

BRIEF DESCRIPTION OF THE DRAWINGS

The above and other subjects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein.

DETAILED DESCRIPTION OF THE PREFERRED EMBODIMENTS

Hereinafter embodiments of the present invention are described in detail with reference to figures. However, note that the present invention is not limited to the following embodiments.

Figure 1:
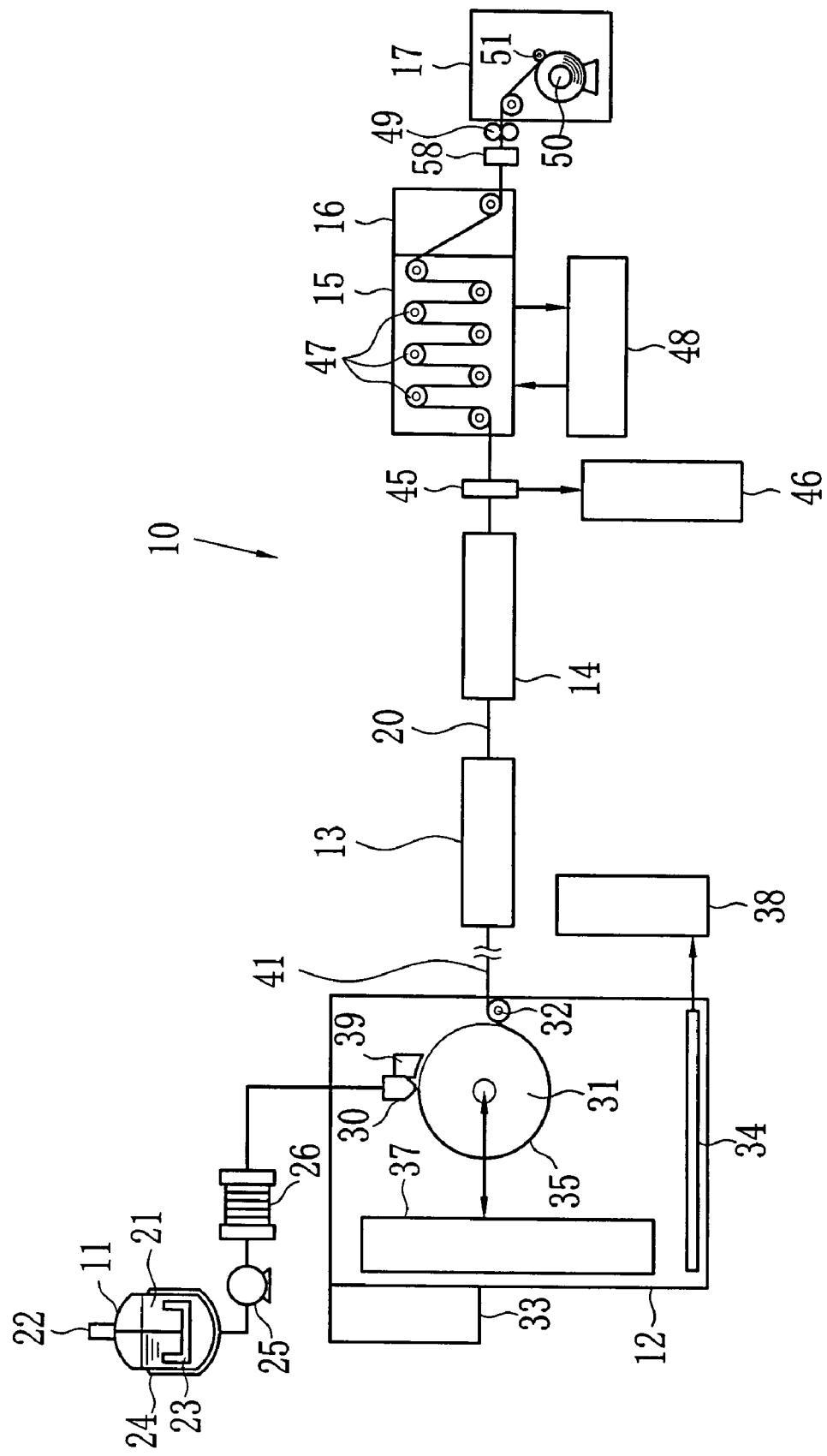
FIG. 1 is a schematic view of a film producing apparatus used in the present invention.

As shown in FIG. 1, a film producing apparatus 10 comprises a reserve tank 11, a casting chamber 12, a pin tenter 13, a clip tenter 14, a drying chamber 15, a cooling chamber 16 and a winding chamber 17.

The reserve tank 11 is provided with a stir blade 23 rotated by a motor 22, and a jacket 24. In the tank 11, dope 21 as material of a film 20 is reserved. The jacket 24, provided around outer peripheral surface of the reserve tank 11, regulates temperature of the dope 21 to be approximately constant. The stir blade 23 rotates to maintain uniformity of the dope 21 (for example, aggregation of polymers is prevented). In addition, in a downstream side from the reserve tank 11, a pump 25 and a filtration device 26 are provided. Note that a preparation method for the dope 21 will be described in detail later.

The casting chamber 12 is provided with a casting die 30 as a dope casing opening, a casting drum 31 as a support, a peeling roller 32 which works as a support roller for peeling a casting film 35 from the casting drum 31, a temperature regulator 33 for regulating temperature inside the casting chamber 12, and a condenser 34 for devolatilization (condense) of vaporized solvent inside the casting chamber 12. Further, a heat transfer medium circulator 37 for regulating surface temperature of the casting drum 31 and a recovering device 38 to recover the solvent condensed by the condenser 34 are provided. In addition, a decompression chamber 39 is provided at a position upstream from the casting die 30 in a moving direction of the casting drum 31 (film conveying direction), to decompress a vicinity of a back (upstream) side of the casting die 30 into a desired pressure.

In downstream side from casting chamber 12, there are a pin tenter 13 which dries a wet film 41 (obtained by peeling the casting film 35 from the casting drum 31) while stretches it in a width direction (perpendicular to the film conveying direction) so as to produce the film 20, and a clip tenter 14 which further dries the film 20 while stretches it in the width direction. The pin tenter 13 has a plurality of pins for holding the wet film 41, and the clip tenter 14 has clips for holding the film 20.

At a position downstream from the clip tenter 14, there is an edge slitting device 45 is provided. A crasher 46 is provided in the edge slitting device 45 to crush cut (slitted) both side edges of the film 20 into fragments (tips).

There are plural rollers 47 and a recovering device 48 in the drying chamber 15. Further, in a position downstream from the cooling chamber 16 which is next to the drying chamber 15, a compulsory neutralization device (neutralization bar) 58 is provided. In addition, in this embodiment, a knurling roller 49 is provided in a position downstream from the compulsory neutralization device 58. In the winding chamber 17, there are a winding roller 50 and a press roller 51.

Figure 2:
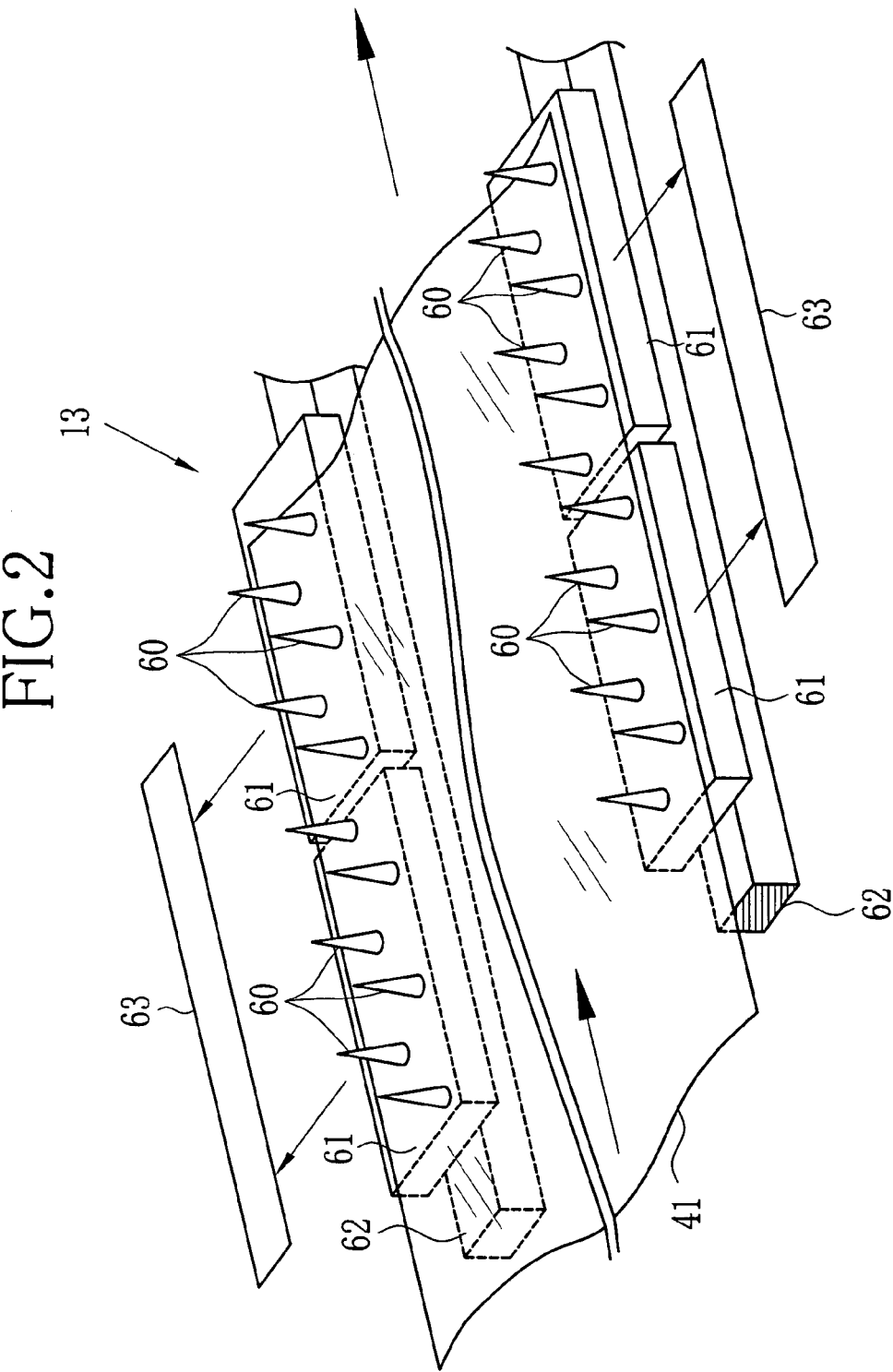
FIG. 2 is a schematic view of a part of a pin tenter used in the present invention.

As shown in FIG. 2, in the pin tenter 13, there is a plurality of pin plates 61 arranged along the film conveying direction near both side edges of the wet film 41, each of the pin plate 61 has a plurality of pins 60. Further, chains 62 to which the pin plates 61 are attached is provided. The chain 62 moves endlessly and circulatory. In addition, a drier (not shown) is provided.

The wet film 41 fed to the pin tenter 13 is fixed on the pin plates 61 by insertion of the pins 60 into the both side edges of the wet film 41. The pin plates 61 are moved by movement of the chains 62. Further, a drag mechanism 63 drags outwardly the pin plates 62 in the width direction of the wet film 41. Accordingly, the wet film 41 is stretched in the width direction. Since the wet film 41 right after peeled from the casting drum 31 is very soft because of inclusion of large amount of the solvent, it is difficult to convey the wet film 41 with keeping the shape thereof. However, as in the present invention, when the wet film 41 is held by the insertion of the pins or the like in the drier, the wet film 41 can be conveyed with superior stability and dried effectively.

In the pin tenter 13, tension applied to the wet film 41 in the width direction for stretching is not limited and can be determined in consideration of composition of the wet film 41, the stretching rate and so on. However, the stretch rate is preferably in a range of 2% to 15%, so as to convey the wet film 41 with keeping planarity thereof without cause of flaw. Note that the stretch rate(%) is obtained from an equation: $\{(Lb-La)/La\} \times 100$, when the width of the wet film 41 at the entrance of the pin tenter 13 is La (mm) and the width of the wet film 41 at the exit of the pin tenter 13 is Lb (mm). When the stretch rate is less than 2%, it is difficult to convey the wet film 41 with keeping planarity thereof. When the stretch rate is more than 15%, the wet film 41 is possibly torn from the portion where the pin 60 penetrates. Note that although the pin tenter 13 is used for holding the wet film 41 by the pins 60 in the above embodiment, other means for holding the both side edges of the wet film 41 may be used.

Next, an example method for producing film by the film producing apparatus 10 will be explained (see FIG. 1 and FIG. 2).

In the reserve tank 11, the temperature of the dope 21 is regulated to 25° C. to 35° C. by the jacket 24 inside which a heat transfer medium flows. The uniformity of the dope 21 is kept by the rotation of the stir blade 23. A proper amount of the dope 21 is fed into the filtration device 26 from the reserve tank 11 by the pump 25, so that the dope 21 is filtrated and impurities in the dope 21 are removed. The dope 21 is cast on the casting drum 31, while a casting bead is formed between the casting die 30 to the casting drum 31.

The casting drum 31 is rotated by a driver (not shown) at a predetermined rotation speed. The surface temperature of the casting drum 31 is regulated within a predetermined range. It is preferable that the surface temperature is approximately constant within a range of −10° C. to 10° C. Since the casting drum 31 is cooled, the casting film 35 formed from the dope 21 can have self-supporting property by cooling solidification (gelation). Note that in the present invention, the gelation means a state that molecules of the polymer surround the solvent so that fluidity of the solvent is restricted so that the solvent cannot flow outwardly. Note that the surface temperature of the casting drum 31 is regulated by the heat transfer medium circulator 37. That is, a heat transfer medium passage (not shown) is formed in the casting drum 31, the heat transfer medium kept at the predetermined temperature passes through the heat transfer medium passage, and the heat transfer medium circulator 37 performs circulation of the heat transfer medium. The temperature of the dope 21 in the casting process is preferably in a range of 30° C. to 35° C. Along with the progress of cooling of the casting film 35, the gelation is accelerated by formation of a cross-linked point to be a core of crystal.

The temperature inside the casting chamber 12 is regulated to an approximately constant value within a certain range, preferably in a range of 10° C. to 30° C., by the temperature regulator 33. In the casting chamber 12, there is the vaporized solvent from the dope 21 and the casting film 35. Accordingly, in this embodiment, the vaporized solvent is condensed by the condenser 34, and then the condensed solvent is recovered by the recovering device 38 and refined by a refining device (not shown), so as to be reused as the solvent for the dope preparation.

Upon obtaining the self-supporting property, the casting film 35 is peeled off as a wet film 41 from the casting drum 31 with the support of a peeling roller 32. Then the wet film 41 is fed to the pin tenter 13.

In the pin tenter 13, the plurality of pins 60 penetrate the both side edge of the wet film 41 to hold it, and the wet film 41 is dried to be the film 20 while being conveyed. Then the film 20 still including the solvent is conveyed to the clip tenter 14. It is preferable that content of the remaining solvent in the film 20 right before entering into the clip tenter 14 is in a range of 50 wt. % to 150 wt. %. In the present invention, the content of the remaining solvent (dry measure basis) is calculated on a following formula:

Content of Solvent=$\{(x-y)/y\} \times 100$ x: weight of a sampling film before the drying y: weight of the sampling film after the drying In the clip tenter 14, clips moved endlessly and circulatory by chains, which clip the both side edge portions of the film 20. While conveyed inside the clip tenter 14, the film 20 is further dried. At the same time, a distance between the clips in both edge portions which face each other is expanded to apply tension to the film 20 in the width direction. Accordingly, the film 20 is stretched in the width direction, which serves to control molecular orientation of the film 20 and give a high retardation value to the film 20.

In the present invention, as the film 20 entering into the clip tenter 14, a polymer film which satisfies K2≦K1 is used, when K1 is a maximum value of X-ray diffraction intensity in a range of 0≦2θ≦10 and K2 is a maximum value of X-ray diffraction intensity in a range of 10≦2θ≦20, in an X-ray analysis chart obtained by reflection method in which an angle between an extended line of an entering X-ray and a reflected X-ray is determined as 2θ(°). The film 20 is stretched in the width direction at the stretch rate in a range of 15% to 40%. Note that the stretch rate(%) is obtained from an equation: $\{(Ld-Lc)/Lc\} \times 100$, when the width of the film 20 at the entrance of the clip tenter 14 is Lc (mm) and the width of the film 20 at the exit of the clip tenter 14 is Ld (mm). In this condition, the molecular orientation in the film 20 can be effectively controlled in one direction, without being torn from the clipped portion and cause of wrinkle and twitch by uneven stress on the film. Accordingly, a product film having high retardation value and superior transparency can be obtained. However, when K1<K2, the molecular orientation cannot be controlled in one direction even by the stretch of the film. Thereby transparency quality of the stretched film is insufficient. In addition, when the stretch rate is less than 15%, the adequate molecular orientation cannot be obtained because the stretch is insufficient. When the stretch rate is more than 40%, the molecular orientation becomes random because of excess stretching, and possibly the planarity of the film is destroyed because of break of the film and so on. Note that the X-ray diffraction intensity is measured by following steps: At first, a sample is prepared from the film 20 just before entering the clip tenter 14; Then X-ray diffraction is performed on the sample at predetermined wavelength intensity.

In the above embodiment, the reflection method is performed in conditions that an X-ray source is a Cu—Kα monochromator, a tube current is 150 mA, a tube voltage is 50V, a scan speed is 2°/min, a divergence slit is 0.15 mm, and a scattering slit is 1°. However, these conditions are not limited to above. The conditions can be optimized in consideration of material, thickness and so on of the sample film, to measure the X-ray diffraction intensity.

Although the surface temperature of the film 20 is not limited, preferably the temperature is in a range of 110° C. to 140° C. In this range, heat damage and so on to the film 20 are prevented and the film 20 can be stretched in the width direction without disarranging the orientation of main chain of the polymer in the conveying direction. In addition, to uniformly stretch the film 20, it is preferable that the surface temperature is approximately constant while the stretching. Although the clip tenter 14 having the clips for holding the film 20 is used in the above embodiment, the holder is not limited to the clips.

In the present invention, the cooling solidification is applied to the casting film 35 to generate the core of crystal, the wet film 41 obtained from the casting film 35 is dried and stably conveyed to be the film 20 by the pin tenter 13, and the film 20 is further dried and stretched in the width direction by the clip tenter 14. Accordingly, in the film 20, the crystallization is developed from the core of crystal while the main chain of the polymer is arranged to the conveying direction. Accordingly, the film 20 having high retardation value can be made, which satisfies 10 nm≦Re≦100 nm and 50 nm≦Rth≦300 nm, when Re(λ) is an in-plane retardation value (unit; nm) of the film 20 at λnm wavelength, Rth(λ) is a thickness retardation value (unit; nm) of the film 20 at λnm wavelength. Note that Re is represented by a formula Re(λ)=(nx−ny)×d, when nx is a refractive index in the direction of the slow axis (film conveying direction) on a film surface, ny is a refractive index in the direction of the fast axis (film width direction) on a film surface, and d(nm) is the film thickness. In addition, Rth is represented by a formula Rth(λ)=$\{(nx+ny)/2-nz\} \times d$, when nz is a refractive index in the thickness direction of the film 20. As described above, by con The film 20 where the drying is developed is fed to the edge slitting device 45. In the edge slitting device 45, the both side edge portions of the film 20 is cut off. The cutting process may be skipped, but preferably is performed at somewhere between the casting chamber 12 to the winding chamber 17. Especially, as in the present embodiment, when the edge slitting device 45 is provided at the position downstream from the clip tenter 14, defects on the both side edge portions of the film 20 caused by fixing or clipping in the stretching process can be removed by the cutting process.

The film 20 is further dried while passing through the drying chamber 15 with support of a plurality of rollers 47. The temperature inside the drying chamber 15 is not especially restricted. However, it is preferable that the surface temperature of the film 20 is in a range of 100° C. to 220° C., so as to effectively vaporize the solvent with reducing heat causing damage of the polymer in the film 20. The solvent vapor is adsorbed and recovered by the recovering device 48, and the air from which the solvent vapor is removed is sent as the drying air again inside drying chamber 15.

The film 20 sufficiently dried is transported into the cooling chamber 16, and cooled to an approximately room temperature. Note that a moisture control chamber (not shown) may be preferably provided between the drying chamber 15 and the cooling chamber 16. Since moisture of the film 20 is controlled before fed into the cooling chamber 16, wrinkle and twitch on the film 20 can be corrected. Therefore, the film 20 with excellent planarity can be obtained.

By the compulsory neutralization device 58, charged voltage on the film 20 is regulated in a certain range (for example −3 kV to +3 kV). In FIG. 1, the neutralization device 58 is disposed in a position downstream from the cooling chamber 16. However, the position of the neutralization device 93 is not restricted in this figure. Further, it is preferable to provide a knurling roller 49 for providing a knurling with an embossing processing. By this process, the film 20 with excellent planarity can be obtained.

At last, the film 20 is wound around the winding roller 50 with controlling a tension of winding by the press roller 59. It is preferable to change the tension from a start to an end of the winding little by little. The length of the film 20 to be wound is preferably at least 100 m in the conveyance direction, and a width thereof is preferably in a range of 1800 mm to 2500 mm. However, even if the width is more than 2500 mm, the present invention is effective. Further, in the present invention, the thickness of the film 20 is not limited. Even when the thickness is thin such as in the range of 15 μm to 100 μm, the present invention is effective.

As the pump 25, a high-precision gear pump is preferably used. However, the type of the pump is not limited in the present invention. It is preferable that the velocity fluctuation of the casting drum 31 is at most 3% and the meandering of the drum 31 in widthwise direction for one rotation is at most 3 mm. Since the casting drum 31 is positioned just below the casting die 30, positional fluctuation of the casting drum 31 considerably affects surface conditions of the casting film 35. In consideration of this problem, the positional fluctuation of the casting drum 31 in vertical direction is preferably regulated at most 500 μm.

As the casting die 30, a coat hanger type is preferably used. A width of the casting die 30 is not limited, but preferably is about 1.05 to 1.5 times larger than a casting width of the dope 21 and 1.01 to 1.3 times larger than a width of the product film. The casting die 30 is preferably polished so as to have the surface roughness of at most 0.05 μm. The material of the casting die 30 preferably has anti-corrosion properties which do not form pitting (holes) on the gas-liquid interface after having been dipped in a mixture liquid of dichloromethane, methanol and water for three months. Particularly, a stainless is preferably used. In view of strength and anti-corrosion property, SUS316 is most preferable material. However, materials having the almost same anti-corrosion properties as SUS316 in examination of corrosion in electrolyte aqua solution can be preferably used. In view of heat damage to the casting die 30, the material of the casting die 30 preferably has coefficient of thermal expansion of at most $2\times10^{-5}$ (° C.$^{-1}$).

Further, it is preferable to manufacture the casting die 30 by grinding the material which passed more than a month after casting. Thereby, the dope 21 is cast into the casting die 30 uniformly. Accordingly, streaks and the like in the casting film 35 are prevented. Preferably, the surface roughness of a contacting surface of the casting die 30 to the dope is at most 1 μm, straightness is at most 1 μm/m in each direction, and the clearance of the slit is automatically controlled in the range of 0.5 mm to 3.5 mm. An end of the contacting portion of each lip to the dope is preferably processed so as to have a chamfered radius at most 50 μm through the slit. In the die, the shear speed is preferably in the range of 1(1/sec) to 5000(1/sec).

Preferably, a temperature regulator (not shown) is attached to the casting die 30 such that the temperature inside the casting die 30 is kept in a predetermined range. Further, it is preferable to provide bolts (heat bolts) at predetermined intervals in the width direction of the casting die 30 for adjusting the thickness of the film, and provide an automatic thickness control mechanism using the heat bolts. When using the heat bolts in the film production, it is preferable to set the profile according to the flow volume of the pump 25 based on a preset program. The casting profile can be also adjusted by a feedback control based on a measured value from a thickness measurement device (for example, an infrared thickness measurement device). Thus, in the film except of the edge portions, the difference of the thickness at any two points apart is preferably at most 1 μm, and further the difference of the minimal thickness value and the maximal thickness value in the widthwise direction is preferably at most 3 μm. Further, the thickness accuracy is preferably adjusted at ±1.5 μm or less.

For improving abrasion resistance, lip ends of the casting die 30 are preferably provided with a hardened layer. In order to provide the hardened layer, there are methods of ceramic coating, hard chrome plating, nitriding treatment and the like. As the ceramic used as the hardened layer, one which is grindable but not friable, with a lower porosity and the good corrosion resistance, is preferred. In addition, the ceramic which has high adhesive property to the casting die 30 and low adhesive property to the dope is preferable. Concretely, as the ceramics, there are tungsten carbide (WC), $Al_2O_3$, TiN, $Cr_2O_3$ and the like, and especially tungsten carbide. Note in the present invention the hardened layer is preferably formed by a tungsten carbide coating in a spraying method.

A device for supplying a solvent (not shown) is preferably provided on the both edges of a die slit in order to prevent the discharged dope 21 partially dried to be a solid. Preferably, the solvent to which the dope was dissoluble (for example, a mixture solvent whose composition is dichloromethane 86.5 mass.pct, methanol 13 mass.pct, n-butanol 0.5 mass.pct) is supplied to each bead edge and the air-liquid interface of the slit. It is preferable to supply the solvent in the range from 0.1 mL/min to 1.0 mL/min to each of the bead edges so as to prevent the impurities from being mixed in the casting film 35. The pump for supplying the solvent preferably has a pulsation at most 5%.

Since the decompression chamber 39 attached to the casing die 30 controls the decompression pressure at a vicinity of a back of the casting bead while the dope 21 is cast toward the casting drum 31, the shape of the casting bead becomes stable. Accordingly, the casting film 35 can have superior surface conditions such as no wrinkle and twitch. The vicinity of the back of the casting bead is preferably decompressed at a pressure from (−2000 Pa to atmospheric pressure) to (−10 Pa to atmospheric pressure). However, the range of the pressure is not limited.

It is preferable that a jacket (not shown) is attached to the decompression chamber 39 to control the temperature inside the chamber. The temperature inside the decompression chamber 68 is not limited, but preferably at least the condensation point of the organic solvent to be used. To stabilize the shape of the casting bead, it is preferable that a suction device (not shown) is attached to the edge portion of the casting die 30. A suction air volume is preferably in a range of 1 L/min to 100 L/min.

Further, it is preferable to provide a pre-drying chamber (not shown) between the edge slitting device 45 and the drying chamber 15 so as to make the pre-drying of the film 20. In this case, the deformation of the film 20 which is caused by the accelerate increase of the temperature of the film 20 is prevented.

A transfer section (not shown) with a plurality of rollers may be provided at a position between the position where the casting film 35 is peeled from the casting drum 31 and the position where the film 20 is wound into the roll, so as to dry the wet film 41. However, the casting film 35 right after gelled by cooling is very soft to be conveyed. Accordingly, the wet film 41 is preferably pre-dried in the pin tenter 13 or the like which can stably convey the film, before entering into the transfer section.

Figure 3:
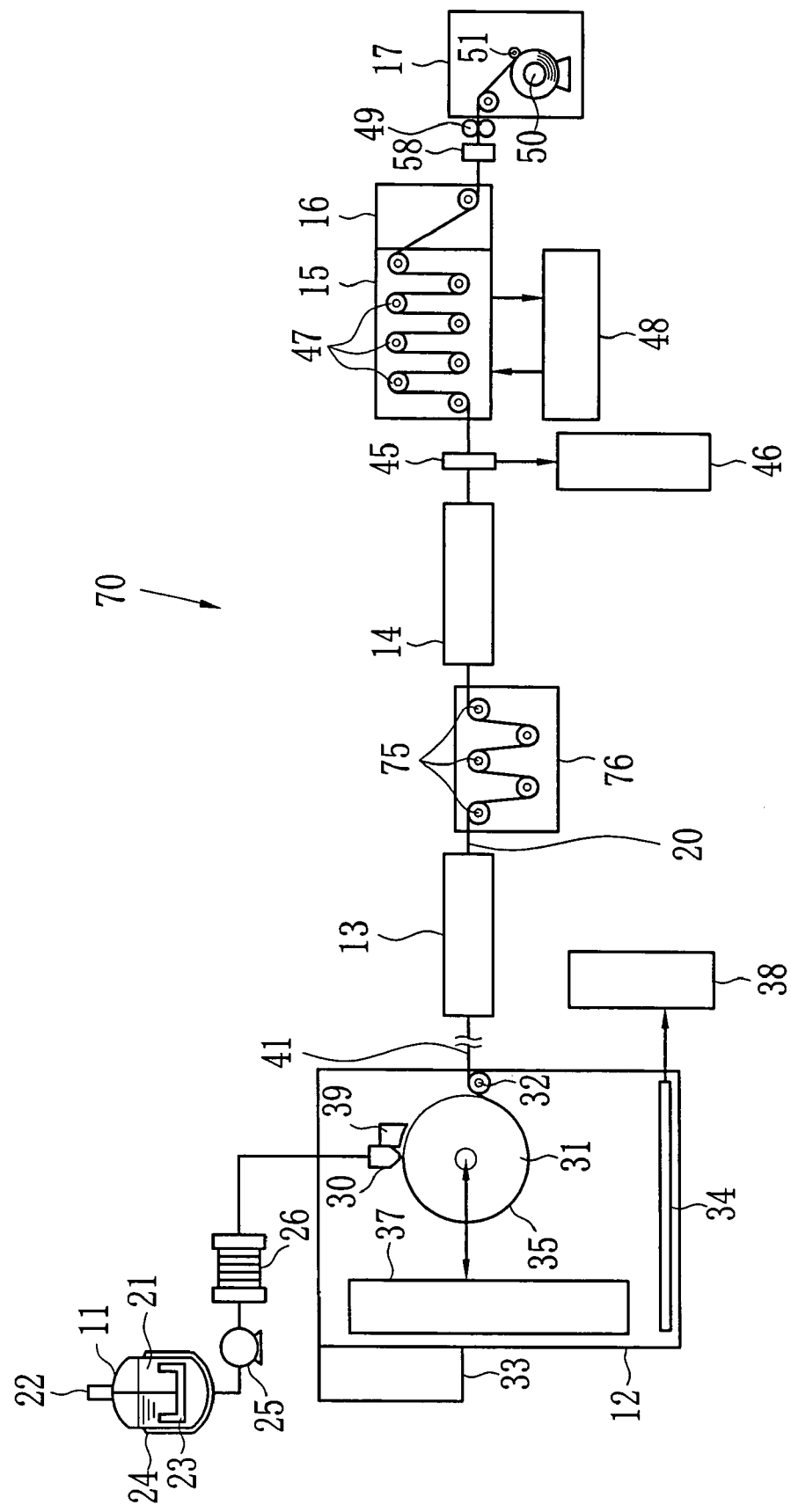
FIG. 3 is a schematic view of another embodiment of the film producing apparatus.

The configuration of the film producing apparatus is not limited to FIG. 1. A film producing apparatus 70 shown in FIG. 3 has a basically same configuration as the film producing apparatus 10. However, a second chamber 76 having a plurality of rollers 75 is provided between the pin tenter 13 and the clip tenter 14. In this embodiment (configuration), the drying chamber 15 is called as the first drying chamber 15. Note that since components, conditions and processes in the film producing apparatus 70 except the second drying chamber 76 are same as the film producing apparatus 10, explanations of them are omitted.

In the second drying chamber 76, while the film 20 dried by the pin tenter 13 is conveyed by the plural rollers 75, it is further dried by a drier (not shown). Since the well-dried film 20 can be fed into the clip tenter 14, the molecular orientation can be more effectively controlled by stretching. Although temperature inside the second drying chamber 76 is not limited, but preferably is near the inside temperature of the clip tenter 14. In this condition, since rapid heat change is not applied to the film 20, cause of heat damage on the film 20 can be reduced. In addition, number of the rollers 75 is not limited and can be determined in consideration of a space inside the second drying chamber 76 and other conditions.

Figure 4A:
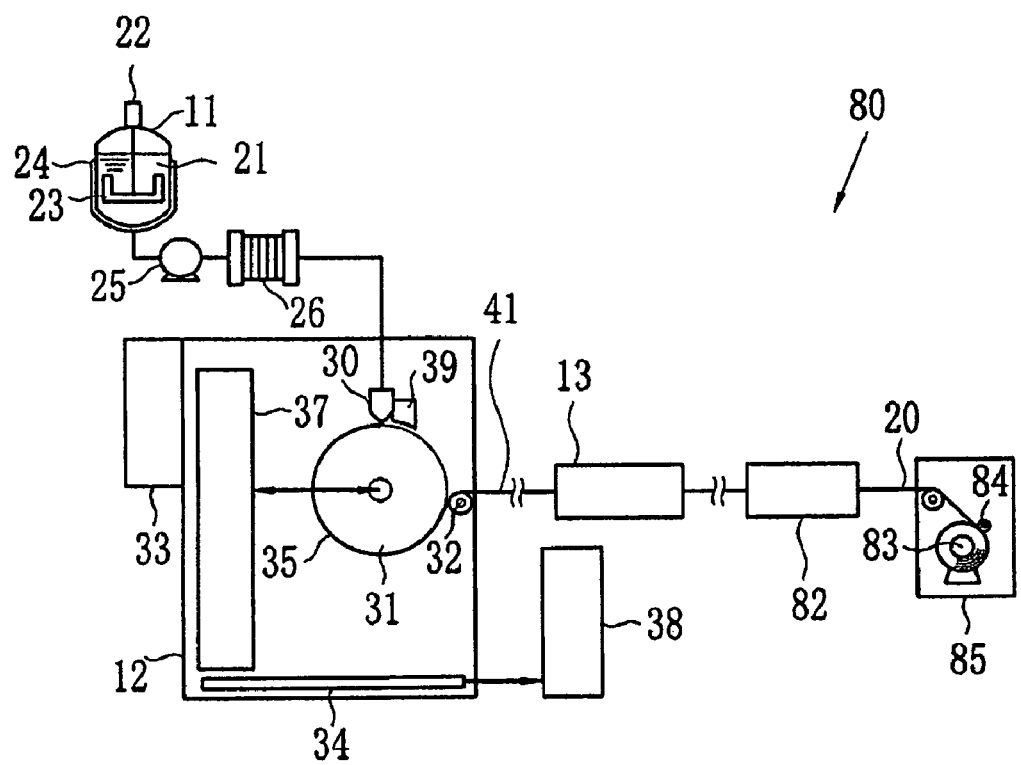
FIG. 4 is a schematic view of still another embodiment of the film producing apparatus.
Figure 4B:
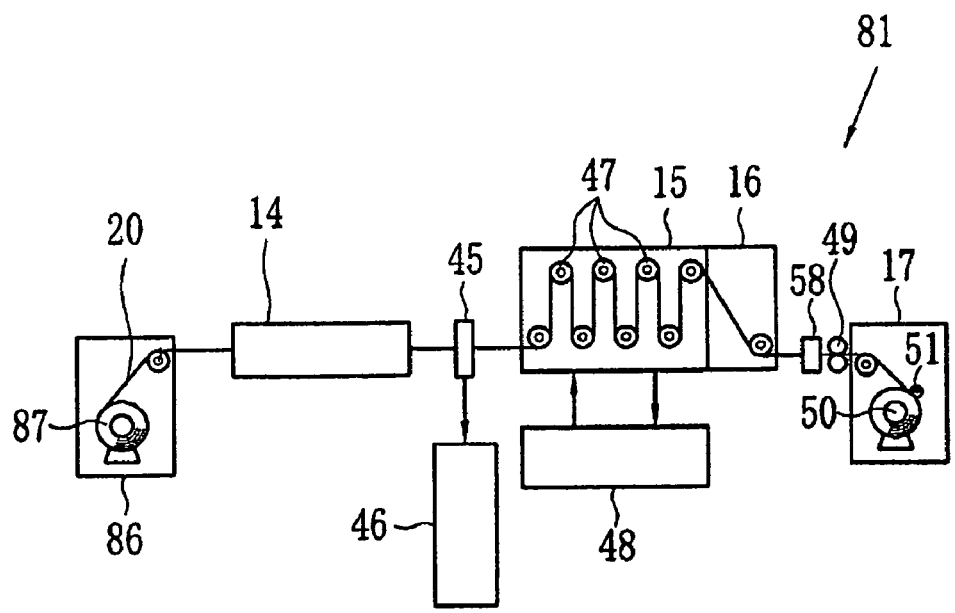

In addition, the film producing apparatus 10 shown in FIG. 1 can be divided into two different apparatus from between the pin tenter 13 and the clip tenter 14. A first film producing apparatus 80 is shown in FIG. 4A and a second film producing apparatus 81 is shown in FIG. 4B. Note that in the present invention, the configurations of the film producing apparatuses 10 and 70 are called as an on-line type, and the configuration of combination of the first and second film producing apparatuses 80 and 81 is called as an off-line type.

In the first film producing apparatus 80, there are a drying chamber 82 for further drying the wet film 41 and a winding chamber 85 in addition to the casting chamber 12 and the pin tenter 13. In the winding chamber 85, a winding roller 83 and a press roller 84 are provided. In the second film producing apparatus 81, there is a feeding device 86 at a position upstream from the clip tenter 14 in the conveying direction.

To produce the product film in the off-line, at first the wet film 41 is formed by the procedure same as in the on-line, then the wet film 41 is dried in the pin tenter 13. Next, the wet film 41 is fed into the drying chamber 82 and further dried in there to be the film 20. The film 20 is wound around the winding roller 83 to be a rolled film (roll 87). After that, the roll 87 is set at the predetermined position in the feeding device 86. The film 20 is fed to the clip tenter 14 and then processed as same as in the on-line, so as to be the product film. A feeding speed of the film 20 at the feeding device 86 is not limited and can be controlled in consideration of the conditions of the film 20, so as not to cause breakage or twitch on the film 20. Since the apparatus can be downsized in the off-line type, there are merits such as saving space.

Note that in the off-line, the roll 87 is not limited to be the roll of the film 20 formed by the solution casting method. For example, even a roll of a transparent film formed by the melt extrusion method or other method is used, the effect of the present invention can be given to the product (stretched) film as long as the transparent film satisfies $K2 \leq K1$ when $K1$ is the maximum value of X-ray diffraction intensity in the range of $0 \leq 2\theta \leq 10$ and $K2$ is the maximum value of X-ray diffraction intensity in the range of $10 \leq 2\theta \leq 20$, in the X-ray analysis chart obtained by reflection method in which the angle between an extended line of an entering X-ray and the reflected X-ray is determined as $2\theta(°)$.

Hereinafter, the producing method for the dope 21 will be described with reference to FIG. 5. However, the present invention is not limited to an embodiment described below.

A dope producing apparatus 90 comprises a solvent tank 91 for containing a solvent, a dissolving tank 92 for mixing materials of the dope 21 (such as solvent and TAC), a hopper 93 for supplying the TAC and a additive tank 94 for storing the additives. The dope producing apparatus 90 further comprises a heater 96 for heating a swelling liquid 95 described below, a temperature regulator 97 for regulating the temperature of the prepared dope 21, a first filtration device 98 for removing foreign body in the dope, a flushing device 99 for adjusting the concentration of the dope, and a second filtration device 100. In addition, the dope producing apparatus 90 comprises a recovering device 101 for recovering the solvent and a refining device 102 for refining the recovered solvent. The dope producing apparatus 90 is connected to the film producing apparatus 10 through the reserve tank 11. Note that the materials of the dope 21 are described in detail below.

The dope 21 is made in the dope producing apparatus 90 by a method in the followings. At first, the solvent is transported from the solvent tank 91 to the dissolving tank 92 by opening a valve 18. Further, the adequate volume of TAC is transported from the hopper 93 to the dissolving tank 92, and the required volume of the additive liquid is transported from the additive tank 94 to the dissolving tank 92 by opening a valve 106.

The dissolving tank 92 comprises a jacket 110 which covers the outside of the tank 92, a first stirrer 112 rotated by a motor 111, and a second stirrer 114 rotated by a motor 113. Temperature inside the dissolving tank 92 is regulated by a heating medium flowing in the jacket 110. The temperature is preferably in the range of −10° C. to 55° C.

By individually controlling the rotation of the first stirrer 112 and the second stirrer 114, a swelling liquid 95 in which the TAC swells in the solvent is made in the dissolving tank 92. Note that preferably the first stirrer 112 has an anchor blade and the second stirrer 114 is an eccentric stirrer of dissolver type.

Next, the swelling liquid 95 is transported to the heater 96 by a pump 115 with controlling transportation volume of the swelling liquid. Preferably, the heater 96 has a jacketed pipe and a pressure device for pressurizing inside the pipe. In the heater 96, solid contents in the swelling liquid 95 are dissolved in the solvent by being heated or by being heated and pressurized (hereinafter this method is called the heating dissolution method). Note that preferably temperature of the swelling liquid 95 is heated in a range of 50° C. to 120° C. A known cooling dissolution method, in which the temperature of the swelling liquid 95 is cooled in a range of −100° C. to −30° C., is also applicable to obtain the dope 21. The heating and cooling dissolution methods are selected according to the properties of the TAC for the dissolving.

A temperature of the dope 21 is controlled to approximately room temperature by the temperature regulator 97, and then the dope 21 is filtrated by the first filtration device 98 so that impurities are removed from the dope 21. Preferably the average hole diameter of a filter in the first filtration device 98 is no more than 100 µm. Preferably flow rate of the filtration is at least 50 L/hour. The dope 21 after the filtration is stored in the reserve tank 11 through a valve 116.

The method stated above, that once the swelling liquid 95 is prepared and then making the dope 21 from the swelling liquid 95, possibly needs high product cost, because longer manufacturing time is required to make the dope 21 having higher concentration of the TAC. To reduce the cost, it is preferable that the dope 21 having the TAC in lower concentration than desired concentration is prepared, and then a concentration process is performed, in which the concentration of the TAC is elevated to the desired concentration. For the concentration process being applied to the dope 21, the dope 21 filtrated in the first filtration device 98 is transported into the flushing device 99 through the valve 116, so that a part of solvent in the dope 21 is vaporized in the flushing device 99. The solvent vapor is condensed into liquid by a condenser (not shown). The liquid is recovered by the recovering device 101 and refined by the refining device 102 to be reused as the solvent for preparing the dope 21. This recycling process has an advantage in terms of cost.

The concentrated dope 21 is drawn from the flushing device 99 out by a pump 117. Further, preferably air bubbles generated in the dope 21 are removed. Any known methods to remove the air bubble are applicable (for example, ultrasonic irradiation method). Next, the dope 21 is transported to the second filtration device 100 in which impurities in the dope 21 are removed. Note that the temperature of the dope 21 when being applied these processes is preferable in a range of 0° C. to 200° C. The dope 21 is transported to and stored in the reserve tank 11. In the reserve tank 11, a stirrer 23 rotated by a motor 22 is provided to constantly stir the dope 21. Accordingly, the quality of the dope 21 in the reserve tank 11 is kept uniform.

The TAC concentration of the dope 21 is preferably in a range of 5 mass % to 40 mass %, especially in a range of 15 mass % to 30 mass %, particularly in a range of 17 mass % to 25 mass %. A concentration of the additives (mainly composed of the plasticizer) is preferably in the range of 1 mass % to 20 mass % to total solid components in the dope 21. Note that methods for adding and dissolving raw materials and additives of the dope 21, filtering the dope 21, removing bubbles, and other methods in the solution casting method for producing the TAC film are explained in Japanese Patent Laid-open publication No. 2005-104148. The content of this publication can be applied to the present invention.

In the above embodiment, the additives are transported to the dissolving tank 92 as the solution. However, there are other methods which can be used. For example, the additives can be directly transported into the dissolving tank 92 if additives are in liquid state at the normal temperature. The additives can be transported into the dissolving tank 92 with being crushed by a hopper if the additive is in solid state. If plural kinds of additives are used, it can be that a solution dissolving all of them is stored in the additive tank 94, and it can be that each of solutions including single additive is stored in a separate additive tank and transported into the dissolving tank 92 through each corresponding pipe.

In the above embodiment, the order in which materials transported into the dissolving tank 92 is the solvent, the TAC and additives. However, the order is not restricted to this way. For example, after the TAC is transported into the dissolving tank 92, the solvent can be transported. In addition, additives is not required to be preliminarily stored in the dissolving tank 92, but can be mixed into a mixture of the TAC and the solvent (hereinafter the mixture is also called as the dope) at the after process.

Hereinafter, materials for preparing the dope 21 will be described.

A cellulose acylate is used as the polymer in this embodiment, and it is preferable that a triacetyl cellulose (TAC) is used as the cellulose acylate. The cellulose acylate, whose degree of the substitution satisfies all of following formulae (I)-(III), is more preferable. In these formulae, A is a degree of substitution of the hydrogen atom of the hydroxyl group to the acetyl group, and B is a degree of substitution of the hydrogen group to the acyl group having 3-22 carbon atoms. Preferably, at least 90 mass % of the cellulose acylate particles has diameter from 0.1 mm to 4 mm. Note that in the present invention, the polymer is not limited to the cellulose ester.

$$2.5 \leq A+B \leq 3.0 \tag{I}$$

$$0 \leq A \leq 3.0 \tag{II}$$

$$0 \leq B \leq 2.9 \tag{III}$$

The cellulose is constructed of glucose units making β-1,4 combination, and each glucose unit has a liberated hydroxyl group at second, third and sixth positions. Cellulose acylate is a polymer in which part or whole of the hydroxyl groups are esterified so that the hydrogen is substituted by acyl groups. The degree of substitution for the acyl groups in cellulose acylate is a degree of esterification at second, third or sixth position in cellulose. Accordingly, when all (100%) of the hydroxyl group at the same position are substituted, the degree of substitution at this position is 1.

When the degrees of substitution for the acyl groups at the second, third or sixth positions are respectively described as DS1, DS2, DS3, the total degree of substitution for the acyl groups at the second, third or sixth positions (namely DS2+DS3+DS6) is preferably in the range of 2.00 to 3.00, particularly in the range of 2.22 to 2.90, especially in the range of 2.40 to 2.88. Further, DS6/(DS2+DS3+DS6) is preferably at least 0.28, and particularly at least 0.30, and especially in the range of 0.31 to 0.34.

The sort of acyl group to be contained in the cellulose acylate of the present invention is may be only one, and two or more sorts of the acyl group may be contained. If the number of the sorts of the acyl groups is at least two, it is preferable that one of the sorts is acetyl group. If the total degree of substitution for the acetyl groups and that for other acyl groups at the second, third or sixth positions are respectively is described as DSA and DSB, the value DSA+DSB is preferably in the range of 2.22 to 2.90, and particularly in the range of 2.40 to 2.88.

Further, the DSB is preferably at least 0.30, and especially at least 0.7. Further, in the DSB, the percentage of a substituent at the sixth position is preferably at least 20%, particularly at least 25%, especially at least 30% and most especially at least 33%. Further, the value DSA+DSB at sixth position is at least 0.75, particularly at least 0.80, and especially at least 0.85. From cellulose acylate satisfying the above conditions, a solution (or dope) having a preferable dissolubility can be prepared. Especially when non-chlorine type organic solvent is used, the adequate dope can be prepared, since the dope can be prepared so as to have a low viscosity and the filterability becomes higher.

The cellulose acylate made from either of linter and pulp cotton is usable in the embodiment.

The acyl group having at least 2 carbon atoms may be aliphatic group or aryl group, and is not restricted especially. As examples of the cellulose acylate, there are alkylcarbonyl ester, alkenylcarbonyl ester, aromatic carbonyl ester, aromatic alkylcalbonyl ester and the like. Further, the cellulose acylate may be also esters having other substituents. The preferably substituents are propionyl group, butanoyl group, pentanoyl group, hexanoyl group, octanoyl group, decanoyl group, dodecanoyl group, tridecanoyl group, tetradecanoyl group, hexadecanoyl group, octadecanoyl group, iso-butanoyl group, t-butanoyl group, cyclohexane carbonyl group, oleoyl group, benzoyl group, naphtylcarbonyl group, cinnamoyl group and the like. Among them, propionyl group, butanoyl group, dodecanoyl group, octadecanoyl group, t-butanoyl group, oleoyl group, benzoyl group, naphtyl carbonyl group, cinnamoyl group and the like are particularly preferable, and propionyl group and butanoyl group are especially preferable.

Solvent compounds for preparing the dope are aromatic hydrocarbon (for example, benzene toluene and the like), halogenated hydrocarbons (for example, dichloromethane, chlorobenzene and the like), alcohols (for example methanol, ethanol, n-propanol, n-butanol, diethylene glycol and the like), ketones (for example acetone, methylethyl ketone and the like), esters (for example, methylacetate, ethylacetate, propylacetate and the like), ethers (for example tetrahydrofuran, methylcellosolve and the like) and the like. In the present invention, the dope refers to the polymer solution and the dispersion liquid obtained by dissolving or dispersing the polymer in the solvent.

The preferable solvent compounds are the halogenated hydrocarbons having 1 to 7 carbon atoms, and dichloromethane is especially preferable. In view of physical properties such as optical properties, a solubility, a peelability from a support, a mechanical strength of the film and the like, it is preferable to use at least one sorts of the alcohols having 1 to 5 carbon atoms with dichloromethane. The content of the alcohols is preferably in the range of 2 mass. % to 25 mass. %, and especially in the range of 5 mass. % to 20 mass. % to total solvent compounds in the solvent. As concrete example of the alcohols, there are methanol, ethanol, n-propanol, isopropanol, n-butanol, and the like. It is preferable to use methanol, ethanol, n-butanol or a mixture thereof.

Recently, in order to reduce the influence on the environment, the solvent containing no dichloromethane is proposed. In this case, the solvent contains ethers with 4 to 12 carbon atoms, ketones with 3 to 12 carbon atoms, esters with 3 to 12 carbon atom, or a mixture of them. For instance, the mixture solvent of the methyl acetate, acetone, ethanol and n-butanol can be used. The ethers, ketones, esthers and alcohols may have a cyclic structure. At least one solvent compound having at least two functional groups thereof (—O—, —CO—, —COO— and —OH) may be contained in the organic solvent.

The cellulose acylate is described in detail in the Japanese patent publication No. 2005-104148, and the description of this application can be applied to the present invention. Further, as the solvent of cellulose acylate and other additives, this application discloses plasticizers, deteoriation inhibitor, UV-absorbing agent, optical anisotropy controlling agent (retardation controller), dye, matting agent, peeling agent and peeling promotion agent are in detail.

The solution casting method of the present invention may be a co-casting method in which a co-casting of two or more sorts of the dopes are made such that the dopes may form a multi-layer film, or a sequentially casting method in which two or more sorts of the dopes are sequentially cast so as to form the multi-layer film. When the co-casting is performed, a feed block may be attached to the casting die, or a multi-manifold type casting die may be used. A thickness of whether upper or lowermost layer of the multi-layer casting film on the support is preferably in the range of 0.5% to 30% to the total thickness of the multi-layer casting film. Furthermore, in the co-casting method, when the dopes are cast onto the support, it is preferable that the lower viscosity dope may entirely cover over the higher viscosity dope. Furthermore, in the co-casing method, it is preferable that the inner dope is covered with dopes whose alcohol contents are larger in the bead from a die to the support.

Note that the laid-open publication No. 2005-104148 teaches in detail the structure of the casting die, the decompression chamber and the support, drying conditions in each processes, a handling method, a winding method after the correction of planarity and curling, a recovering method of the solvent, a recovering method of film and the like. The description of the above publication may be applied to the present invention.

[Characteristics, Measuring Method]

The laid-open publication No. 2005-104148 teaches the characteristics and the measuring method of the cellulose acylate film, which may be applied to the present invention.

[Surface Treatment]

It is preferable to make a surface treatment of at least one surface of the cellulose acylate film. Preferably, the surface treatment is at least one of glow discharge treatment, atmospheric pressure plasma discharge treatment, UV radiation treatment, corona discharge treatment, flame treatment, and acid or alkali treatment.

[Functional Layer]

A primary coating may be made over at least one surface of the cellulose acylate film. Further, it is preferable to provide other functional layers for the cellulose acylate film as a film base so as to obtain a functional material. The functional layers may be at least one of antistatic agent, cured resin layer, antireflection layer, adhesive layer for easy adhesion, antiglare layer and an optical compensation layer.

Preferably, the functional layer contains at least one sort of surfactant in a range of 0.1 $mg/m^2$ to 1000 $mg/m^2$. More preferably, the functional layer contains at least one sort of lubricant in a range of 0.1 $mg/m^2$ to 1000 $mg/m^2$. Further, preferably, the functional layer contains at least one sort of matting agent in a range of 0.1 $mg/m^2$ to 1000 $mg/m^2$. Furthermore, preferably, the functional layer contains at least one sort of antistatic agent in a range of 1 $mg/m^2$ to 1000 $mg/m^2$.

Methods for performing a surface treatment on the cellulose acylate film to achieve various functions and characteristics are described in Japanese Patent Laid-Open Publication No. 2005-104148 including the conditions and methods in detail, which can be applied to the present invention.

Applications of the film of the present invention will be described. The film obtained by the present invention has the high retardation value and the superior transparency. Accordingly, the film is especially useful as a protective film in a polarizing filter. A LCD formed such that two polarizing filters are attached to a liquid crystal layer, each of the polarizing filter is a polarizer provided with the film of the present invention attached thereon, can display a high-quality image. However, the arrangement of the liquid crystal layer and polarizing filters is not limited above and any known arrangement may be used. For example, the laid-open publication No. 2005-104148 discloses TN type, STN type, VA type, OCB type, reflection type, and other example in detail. To these types can be applied the film of the present invention. Further, the application teaches the cellulose acylate film provided with an optical anisotropic layer and that provided with antireflective and antiglare functions. Furthermore, the application supposes to provide the cellulose acylate film with adequate optical functions, and thus a biaxial cellulose acylate film is obtained and used as the optical compensation film, which can be used as the protective film in the polarizing filter simultaneously. The restriction thereof described in the laid-open publication No. 2005-104148 can be applied to the present invention.

Hereinafter, examples are described to concretely explain the present invention. However, the present invention is not limited to the examples. Note that the detailed explanations are given only in the experiment 1.

EXAMPLE 1

Figure 5:
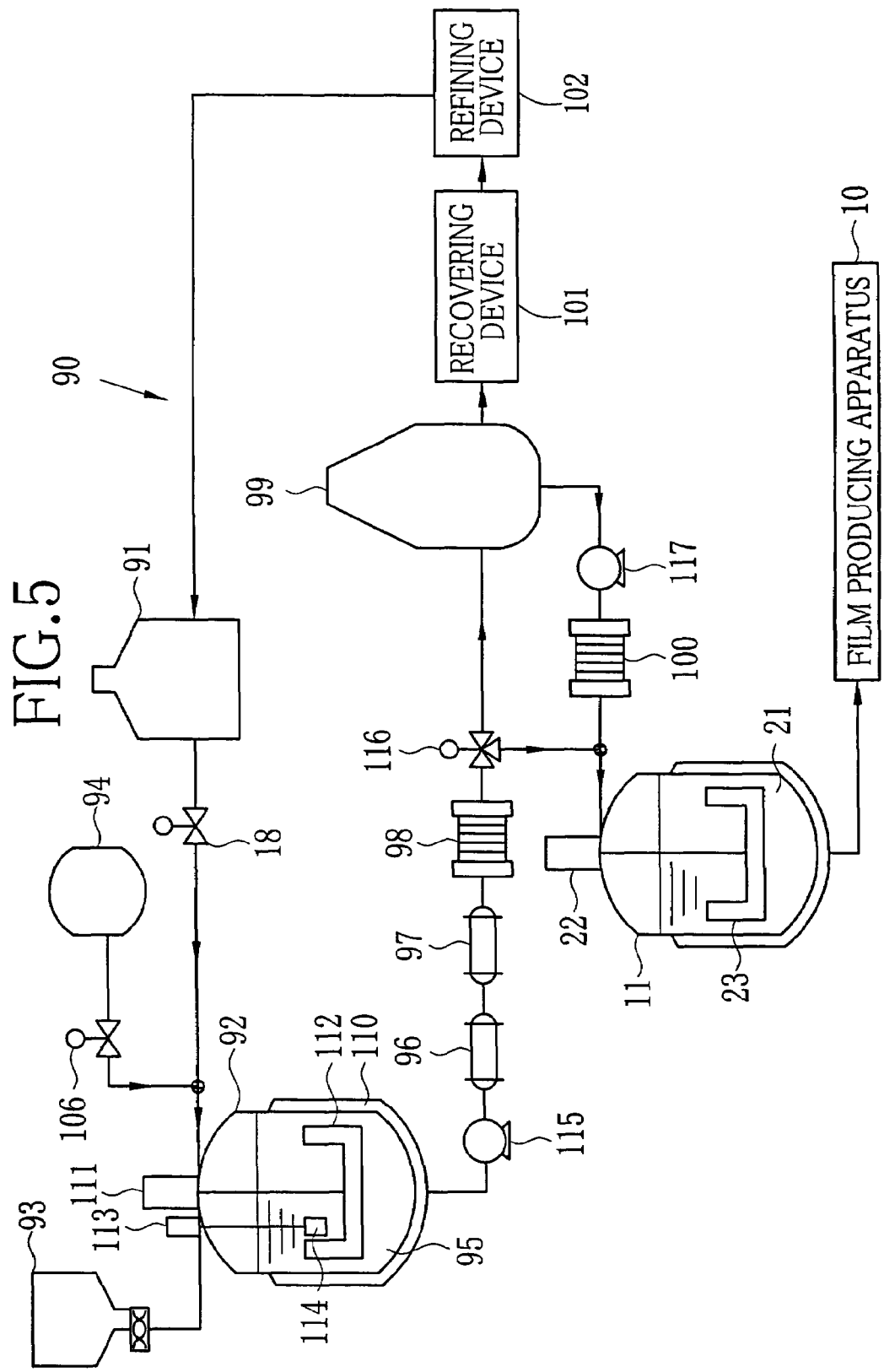
FIG. 5 is a schematic view of a dope producing apparatus used in the present invention.

The dope 21 was prepared from following materials by the dope producing apparatus shown in FIG. 5. The composition of the dope 21 is shown below.

compound is shown as (a), and rod-like compound is shown as (b). As the retardation controller A, the plate-like compound, the rod-like compound or the mixture of them can be used.

[Chemical Formula 1]

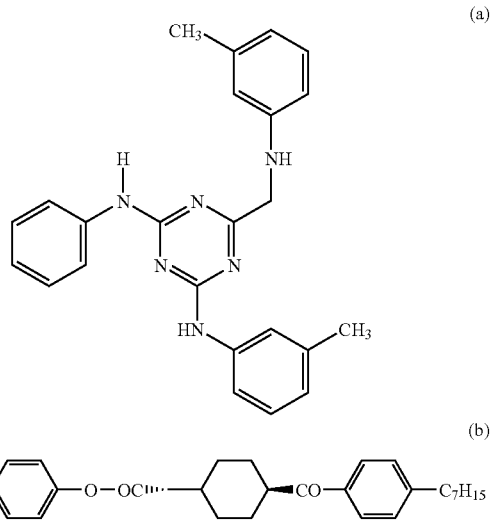

Note that in the cellulose triacetate used in the example, content of remaining acetic acid was less than 0.1 mass. %, content of Ca was 58 ppm, content of Mg was 42 ppm, content of Fe was 0.5 ppm, content of free acetic acid was 40 ppm, and content of ion sulfate was 15 ppm. Degree of acetyl at $6^{th}$ position was 0.91 and that content was 32.5% of all acetyl and content extract from TAC by the acetone was 8 mass. %. A ratio of the average of molecular weight by weight to the average of molecular weight by number was 2.5. And yellow index of the obtained TAC was 1.7, haze was 0.08 and transparency was 93.5%. Tg (glass transition point measured by DSC) was 160° C. and calorific value in crystallization was 6.4 J/g.

| | |
|---|---|
| Cellulose triacetate | 100 mass. pct |
| (substitution degree of acetyl group was 2.84, viscometric average degree of polymerization was 306, moisture content was 0.2 mass. %, viscosity of 6% by mass of dichloromethane solution was 315 mPa · s, powder whose average of particle diameter was 1.5 mm and standard deviation of the particle diameter was 0.5 mm) | |
| Dichloromethane (the first component of the solvent) | 320 mass. pct |
| Methanol (the second component of the solvent) | 83 mass. pct |
| 1-Butanol (the third component of the solvent) | 3 mass. pct |
| PlasticizerA (Triphenylphosphate) | 7.6 mass. pct |
| PlasticizerB (Diphenylphosphate) | 3.8 mass. pct |
| UV-absorbing agent a: 2-(2'-hydroxy-3',5'-di-tert-butylphenyl)benzotriazol | 0.7 mass. pct |
| UV-absorbing agent b: 2-(2'-hydroxy-3',5'-di-tert-amylphenyl)-5-chlorobenzotriazole | 0.3 mass. pct |
| Citric acid ester mixture: (citric acid, monoethylester, dietylester, trietylester) | 0.006 mass. pct |
| Particles: (silicon dioxide having a diameter of 15 nm, and Mohs hardness of approximate 7) | 0.05 mass. pct |
| Retardation controller A (shown in chemical formula 1) | 8 mass. pct |

The retardation controller A is a material for increasing the retardation of the film. In Chemical Formula 1, plate-like In the stainless dissolving tank 92 with volume 4000 L, the plural solvents were mixed and stirred so as to be the mixture solvent. Note that each of those solvents has at most 0.5 mass. % of moisture content. Flake powder of the TAC was gradually added into the dissolving tank 92 from the hopper 93. The powder of the TAC was dispersed in the dissolving tank 92 for 30 minutes using the first stirrer 112 having the anchor blade (the peripheral speed of 1 m/sec) and the second stirrer 114 which is the dissolver type (the peripheral speed of 5 m/sec). Temperature at start of the dispersion was 25° C., and that at the end of the dispersion was 48° C. As retardation controller B, N-N-di-m-tolyl-N-p-methoxyphenyl-1,3,5-triazine-2,4,6-triamine is added and mixed in the dissolving tank 92. The content thereof is regulated such that it becomes 6.6 mass. % of total mass of the produced film.

Further, the prepared additive solution in the additive tank 94 was transported into the dissolving tank 92 with volume regulated by the valve 116. A weight of the content including the additive solution in the dissolving tank was 2000 kg. After the dispersion of the additive solution is completed, stirring by the first stirrer 112 is continued for 100 minutes at the peripheral speed of 0.5 m/sec. Thereby, the TAC flake was swelled to obtain the swelling liquid 95. Inside of the tank 92 was pressurized to 0.12 MPa with nitrogen gas until the swelling. At this time the oxygen concentration inside the dissolving tank 92 was kept less than 2 vol %, therefore it was no possibility of explosion. And the content of the water was 0.3 mass. % in the swelling liquid 95.

The swelling liquid 95 was transported by the pump 115 from the dissolving tank 92 to the heater 96. The swelling liquid 95 was heated to 50° C. at first in the heater 96, and then heated to 90° C. under the pressure of 2 MPa, so as to be dissolved completely. At this time, the heating time was 15 minutes. Next, the temperature of the dissolved solution became 36° C. in the temperature regulator 97, and the solution was filtrated by the first filtration device 98 with a filter whose nominal pore diameter was 8 μm. Accordingly, a low concentration dope was obtained. At this time, a pressure at the primary side was 1.5 MPa and a pressure at the secondary side was 1.2 MPa in the first filtration device 98. As the material of the filter, the housing and the pipe, which reach to high temperature, HASTELLOY alloy having excellent anti-corrosion property was used.

The dope before concentration was flashed in the flashing device 99 kept at a normal pressure at 80° C. to vaporize the solvent. The solid content concentration of the flashed (concentrated) dope 21 was 22.5 mass %. The solvent vapor was recovered by the recovering device 101, and then the recovered solvent was refined in the refining device 102 and fed to the solvent tank 91, so as to be reused as the solvent for the dope preparation. In the recovering device 101 and the refining device 102, distillation and dehydration were carried out. In the flash tank of the flash device 99, a stirrer (not shown) with the anchor blade was provided, rotating at a peripheral speed of 0.5 m/sec to remove the foams in the flashed dope 21. A temperature of the dope 21 in the flash tank was 25° C. An average residence time of the dope 21 in the tank was 50 minutes. The dope 27 was extracted and a shear viscosity was 450 Pa·s measured at 25° C. at a shear rate of 10(1/s).

After that, the dope 21 was exposed to weak ultrasonic waves such that the foams in the dope 21 were removed. Next, the dope 21 passed through the second filtration device 100 while being pressurized to 1.5 MPa by the pump 117. In the second filtration device 100, the dope firstly passed through a metal sintered filter whose nominal pore diameter is 10 μm and secondly passed through a sintered filter whose nominal pore diameter is also 10 μm. The primary side pressures at each filtration were 1.5 MPa and 1.2 MPa, and the secondary pressures at each filtration were 1.0 MPa and 0.8 MPa. After the filtration, the dope 21 was transported and stored into the stainless reserve tank 11 with volume of 2000 L while the temperature thereof was regulated to 36° C. The reserve tank 11 comprised the stirrer 23 which has an anchor blade on the center shaft, so as to continuously stir the content in the reserve tank 11 at the periphery speed of 0.3 m/sec.

The film 20 was produced in the film producing apparatus 10 as shown in FIG. 1. The dope 21 in the reserve tank 11 was transported into the filtration device 26 by a high-precision gear pump 25. The pump 25 has a function to boost a pressure in the primary side thereof. The pressure in the primary side was controlled to 0.8 MPa by feedback for the upstream side of the pump 62. The volume efficiency of the pump 25 was 99.2%. And the fluctuation of the volume of discharge was at most 0.5%. The pressure of discharge was 1.5 MPa. The dope 21 passed through the filtration device 26 was transported to the casting die 30.

The casting die 30 was the coathanger type having 1.8 m width, in which the bolts (the heat bolts) for adjusting the thickness of the film were provided. Each pitch of bolts was 20 mm. The casting die 30 automatically regulates the thickness of the film by the heat bolts. The heat bolts can set the casting profile according to the flow volume from the pump 25 by the preset program. The casting profile was adjusted by the feedback control based on the measured value from the infrared thickness measurement device (not shown) provided in the film producing device 10. The material of the casting die 30 is the precipitation hardened stainless steel. The material had coefficient of thermal expansion of at most $2 \times 10^{-5}$ (° $C.^{-1}$). The surface roughness of a contacting surface of the casting die 30 to the dope was at most 1 μm, straightness was at most 1 μm/m in each direction, and the clearance of the slit was controlled to 1.5 mm. On the lip ends of the casting die 30, the hardened layer was formed by the tungsten carbide coating in the spraying method. The end of the contacting portion of each lip to the dope was processed so as to have the chamfered radius at most 50 μm through the slit.

The casting was made with regulating a flow rate of the dope 21 from the casting die 30, such that the thickness of the dried film 20 might be 110 μm and the width of the casting (from the slit of the casting die 30) might be 1700 mm. In order to regulate the temperature of the dope 21 to 36° C., a jacket (not shown) was provided with the casting die 30. Temperature of the casting die 30 and pipes between the casting die 30 and the filtration device 26 were controlled to 36° C. while operating. In addition, the decompression chamber 39 was provided upstream from the casting die 30 in the conveying direction, for controlling the pressure at the vicinity of the back of the casting bead to be −300 Pa from atmospheric pressure. In order to prevent that the discharged dope 21 is partially dried to be a solid, a solvent to which the dope 21 was dissoluble was supplied at 0.5 ml/min to each bead edge and the air-liquid interface of the slit. The pump for supplying the dope has a pulsation at most 5%.

As the support, the casting drum 31 was used. The casting drum 31 has a diameter of 3 m and a width of 1.5 m. A surface thereof was processed by chrome-plating and polish to have a surface roughness of no more than 0.05 μm, sufficient strength and resistance to corrosion, without making defects thereon. In the casting drum 31, a heat transfer medium passage was provided. The transfer medium circulator 37 fed the heat transfer medium into the heat transfer medium passage, to maintain the surface temperature of the casting drum 31 constantly at −10° C. In addition, the casting drum 31 was disposed such that the closest distance between the casting drum 31 and the lip of the casting die 30 (normally the dope casting position) is fluctuated at most 500 μm through one rotation of the casting drum 31.

The temperature inside the casting chamber 12 was kept at 35° C. by the temperature regulator 33. To the casting film 35 formed on the casting drum 31, dry air was fed from a drier (not shown). Saturation temperature thereof was near −8° C. On the drum 31, the oxygen concentration in the dry atmosphere was held at 5 volume %. Note that the displacement of air to Nitrogen gas was made so as to keep this oxygen concentration at 5 volume %. In addition, exit temperature of the condenser 34 was set at −10° C., to condense the solvent inside the casting chamber 12 vaporized from the casting film 35. A wind shielding plate (not shown) was provided for preventing that the dry air directly contacts the casting bead of the casting film 35 within 5 seconds after the casting. Static pressure fluctuation at an area proximal to the casting die 30 was regulated at most ±1 Pa.

When the content of the remaining solvent in the casting film 35 was reached to 280 wt. %, the casting film 35 was peeled from the casting drum 31 with being supported by the peeling roller 32, to form the wet film 41. At this time, to apply tension in the conveying direction with preventing peeling defect, the peeling speed (peeling roller draw) was regulated to 4% to the rotation speed of the casting drum 31.

The wet film 41 was fed into the pin tenter 13. In the pin tenter 13, the wet film 41 was dried while transported therein with the both side edge of the wet film 41 being held by the pins, so as to become the film 20. At this time, the wet film 41 was stretched in the width direction at the stretch rate of 5%. The temperature in the pin tenter 13 was controlled approximately constant within the range of 70° C. to 130° C.

Next, the film was fed into the clip tenter 14. The clip tenter 14 has plural sections each of which can have inside temperature different to each other. In the clip tenter 14, the wet film 41 was further dried while transported through each section, with the both side edge of the wet film 41 being held by the clips. At this time, the temperature inside the each section was controlled such that the surface temperature of the film 20 was in a range of 120° C.±20° C., and the film 20 was stretched in the width direction at the stretch rate of 25%. The temperature of the dry air was maintained approximately constant while the film 20 was stretched or relaxed.

The both side edge portions of the film 20 were cut by the edge slitting device 45 within 30 seconds after the film 20 passed through the outlet of the clip tenter 14. The both side edge portions of the film 20 were cut by using a NT type cutter at 50 mm from each side edge. The cut edge portions were transported to the crusher 46 by a cutter blower (not shown). The crusher 46 crushed the edge portions into chips with an average size of 80 mm². The chips were used again as the material for the dope production with TAC flakes. Before drying the film 20 at a high temperature in the drying chamber 15, the film 20 was preheated in a preheating chamber (not shown) which supplies the drying air of 100° C.

When the content of the remaining solvent was reached 5 wt. % in the film 20, the film 20 was fed into the drying chamber 15. In the drying chamber 15, a blower (not shown) was provided to feed dry air whose temperature was controlled, to control the surface temperature of the film 20 to a range of 140° C.±40° C. The tension of the film 20 given by the roller 47 in the transporting was regulated to 100 N/m and the film 20 was dried for ten minutes so that the content of the remaining solvent in the film 20 finally became to 1 wt. %. The solvent vapor in the drying chamber 15 was removed by the adsorbing device 42. The adsorbing agent was activated carbon, and the desorption was performed by the dried nitrogen. The water content in the recovered solvent was reduced to at most 0.3 mass. %, and thereafter the recovered solvent was used for the solvent for preparing the dope.

The film 20 was subject to moisture control in a first moisture control chamber and a second moisture control chamber (both are not shown), for correction of curling and so on. The air with the temperature of 50° C. and the dew point of 20° C. was fed in the first moisture control chamber. Further, the film 20 was transported into the second moisture control chamber, where the air with the temperature 90° C. and the humidity of 70% was directly fed onto the film 20.

The film 20 after the moisture thereof being controlled was cooled to equal to or less than 30° C. The neutralization device (neutralization bar) 58 was provided so that the charged voltage in the film 20 in transporting was kept in a range of −3 kV to +3 kV. Further, then knurling on the both sides of the film 20 was made with use of the knurling roller 49. The knurling was given such that the film 20 was embossed from one of the both sides. An average width of the area for knurling was 10 mm, and the pressure of the knurling roller 49 was determined so that an average height of convex might be 12 μm higher than the average thickness of the film 20.

The film 20 was wound with use of the winding roller 50 whose diameter is 169 mm, in the winding chamber 17. The tension of the film 20 was 300 N/m in the beginning of winding, and was 200 N/m in the end of winding. Accordingly, a rolled product of the film 20 was obtained. In the winding, the temperature of the film 20 was 23° C., the water content was 1.0 wt. %, and the content of the remaining solvent was 1.0 wt. %. In the winding chamber 17, the temperature and the humidity were kept to 28° C. and 70%. Further, an ionizer (not shown) was provided in the winding chamber 17 so that the charged voltage in the film 20 was kept in a range of −1.5 kV to +1.5 kV. A fluctuation range (oscillation range) in the width direction of the winding film was ±5 mm, and one length period of weaving measurement on the winding roller 50 was 400 m. The pressure of the press roller 51 toward the winding roller 50 was 50 N/m. Note that in the film producing apparatus 10, through the whole processes, an average drying rate of the casting film 35, the wet film 41 and the film 20 was 20 wt. %/min.

Figure 6:
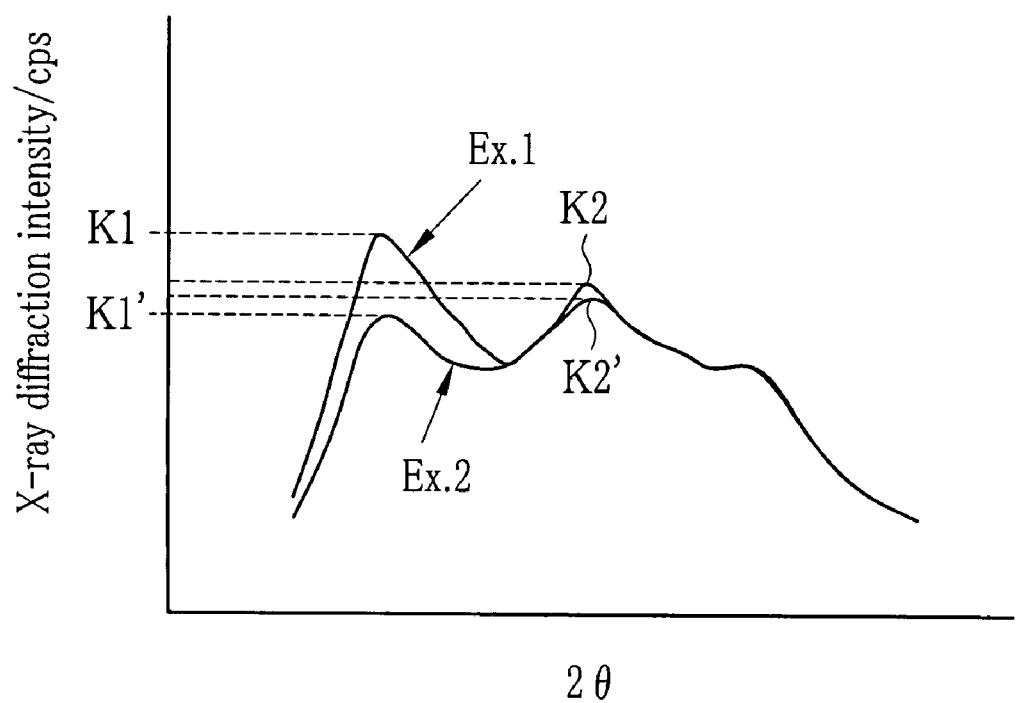
FIG. 6 is a graph showing an X-ray diffraction intensity of a wet film formed in Examples.

In Example 1, a product film of roll shape was obtained. The product film has a thickness of 85 μm and a superior appearance with no wrinkle and loosely wound portion. In an impact test of 10 G, no weaving was caused on the product film. When the X-ray diffraction intensity of the film 20 right before entering into the clip tenter 14 was measured by the reflection method, K1 was 15000 cps and K2 was 13500 cps (that is, K2≦K1). This relationship is illustrated in FIG. 6, with the curve labeled Ex. 1.

The retardation value and haze (as an indicator of the transparency) of the film 20 obtained by each example was measured and evaluated by following procedures.

[Measurement of Retardation Values Re and Rth]

A sample of 70 mm×100 mm was cut out from the product film, and the sample was disposed in the atmosphere at 25° C. and 60% relative humidity for 2 hours, and then the refractive indices in the conveying direction, the width direction and the thickness direction were respectively measured at the wavelength ($\lambda$) of 632.8 nm, with use of an automatic birefringence meter (KOBRA-21DH; produced by Oji Scientific Instruments). The measured values were inserted into the formulae $Re(\lambda)=(nx-ny)\times d$ and $Rth(\lambda)=\{(nx+ny)/2-nz\}\times d$, to calculate Re and Rth, as the retardation values of the film 20. As the result in Example 1, Re was 60 nm and Rth was 220 nm.

[Measurement of Haze]

A part of the film 20 was cut off as a sample, and scattered light transmission of the sample was measured by a scattered light transmission measuring equipment (HGM-2DP; produced by SUGA TEST INSTRUMENTS Co., Ltd.), to obtain haze value(%) of the sample. The haze value is an index shown in percent obtained by dividing the scattered light transmission by the total light transmission of the sample. In Example 1, the haze value was 0.5%.

EXAMPLE 2

In Example 2, the apparatuses and conditions for manufacturing the film was same as Example 1, except that a casting belt was used as the support (that is, the casting film 35 becomes to have the self-supporting property not by cooling solidification, but by drying). When the X-ray diffraction intensity of the film 20 right before entering into the clip tenter 14 was measured by the reflection method, K1 was 12000 cps and K2 was 13200 cps (that is, K1<K2). This relationship is illustrated in FIG. 6, with the curve labeled Ex. 2. In addition, Re was 55 nm, Rth was 210 nm, and the haze value was 3.2%.

As a result of evaluation of the films 20 obtained by Example 1 and Example 2, it is found that the film 20 of Example 1 has the superior values both in the retardation and the transparency compared to the film 20 of Example 2. Especially, in regard to the transparency, the film of Example 1 has more than 6 times higher value than the film of Example 2. From the result, it is found that the retardation value and the transparency of the film is changed according to change of the X-ray diffraction intensity of the wet film right before entering to the clip tenter, and the X-ray diffraction intensity is changed according to change of kind of the support. As the factor for generating difference of the X-ray diffraction intensity, it is assumed that crystallization of the polymer is promoted because the wet film including large content of the remaining solvent (high volatility content) is formed on the casting drum in cooling solidification method and heated at high temperature. In addition, it is assumed that the high retardation value is achieved because the molecular orientation in the wet film is effectively controlled with aid of the retardation controller, when the wet film having such X-ray diffraction intensity (that is, crystal construction is denser in low angle than high angle) is stretched in the width direction by the clip tenter.

As described above, the film having the high retardation value can be manufactured without degrading the transparency, when the casting film is formed with use of the casting drum with the cooled surface as the support, the casting film becomes to have self-supporting property by cooling solidification, the wet film obtained by peeling off the casting film from the support is dried in the pin tenter to be the film, and the film is further dried and stretched in the width direction in the clip tenter, wherein the X-ray diffraction intensity of the film right before entering into the clip tenter is satisfied the above-described conditions.

Although the present invention has been fully described by the way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A manufacturing method of a polymer film, including steps of:

casting dope including polymer and solvent on a support for forming a casting film;

peeling said casting film as a wet film from said support after said casting film becomes self-supporting by cooling solidification;

feeding said wet film to a pin tenter and drying in said pin tenter said wet film to be said polymer film, said polymer film satisfying $K2 \leq K1$, when K1 is a maximum value of X-ray diffraction intensity in a range of $0 \leq 2\theta \leq 10$ and K2 is a maximum value of X-ray diffraction intensity in a range of $10 \leq 2\theta \leq 20$, in an X-ray analysis chart obtained by reflection method in which an angle between an extended line of an entering X-ray and a reflected X-ray is determined as $2\theta(°)$; and feeding said polymer film satisfying $K2 \leq K1$ to a clip tenter and stretching in said clip tenter said polymer film in the width direction thereof at a stretch rate in a range of 15% to 40%.

2. A manufacturing method of a polymer film claimed in claim 1, wherein said cooling solidification of said casting film is performed by keeping a surface temperature of said support approximately constant within a range of −10° C. to 10° C.

3. A manufacturing method of a polymer film claimed in claim 1, wherein said wet film is conveyed in said pin tenter with both side edges thereof being held by plural pins.

4. A manufacturing method of a polymer film claimed in claim 1, wherein in said clip tenter, said polymer film is stretched by application of tension in the width direction and conveyed with both side edges thereof being held by clips.

5. A manufacturing method of polymer film claimed in claim 1, wherein a temperature range for drying said wet film is 100° C. to 220° C.

6. A manufacturing method of polymer film claimed in claim 1, wherein K1 is 15,000 counts per second and K2 is 13,500 counts per second.

* * * * *